July 24, 1951 A. MATHISEN ET AL 2,562,110
MEANS FOR STOPPERING AND OPENING CONTAINERS
Filed Feb. 10, 1949 7 Sheets-Sheet 1

INVENTORS
A. MATHISEN,
H. B. RANDOLPH
By
Benj. J. Chromy
THEIR ATTORNEY

July 24, 1951  A. MATHISEN ET AL  2,562,110
MEANS FOR STOPPERING AND OPENING CONTAINERS
Filed Feb. 10, 1949  7 Sheets-Sheet 2
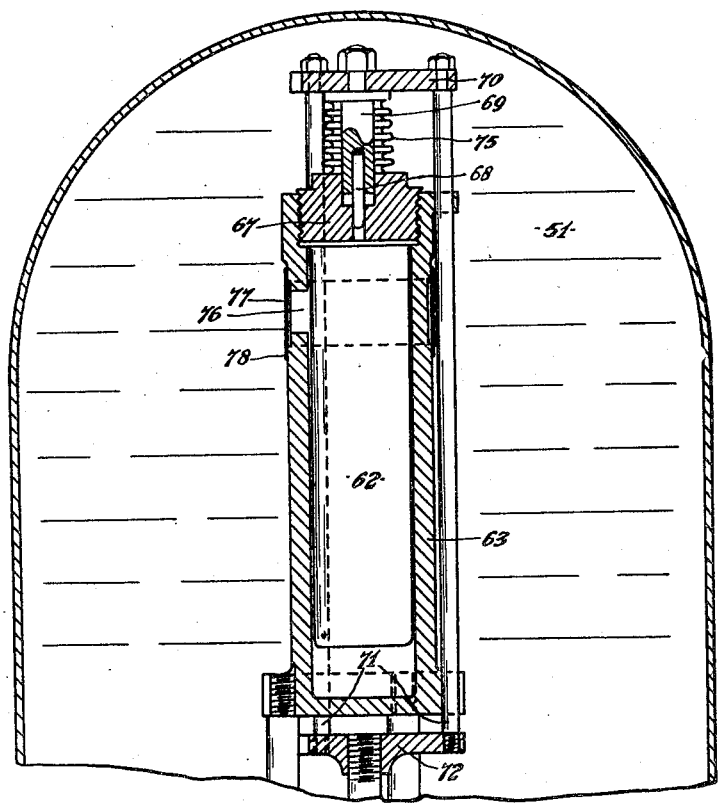
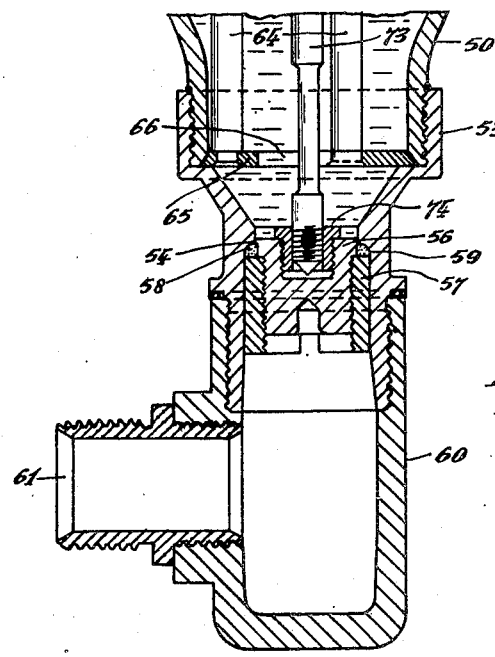
Fig. 2.
INVENTORS
A. MATHISEN,
H. B. RANDOLPH
By
Ben J. Chromy
THEIR ATTORNEY July 24, 1951 A. MATHISEN ET AL 2,562,110
MEANS FOR STOPPERING AND OPENING CONTAINERS
Filed Feb. 10, 1949 7 Sheets-Sheet 3
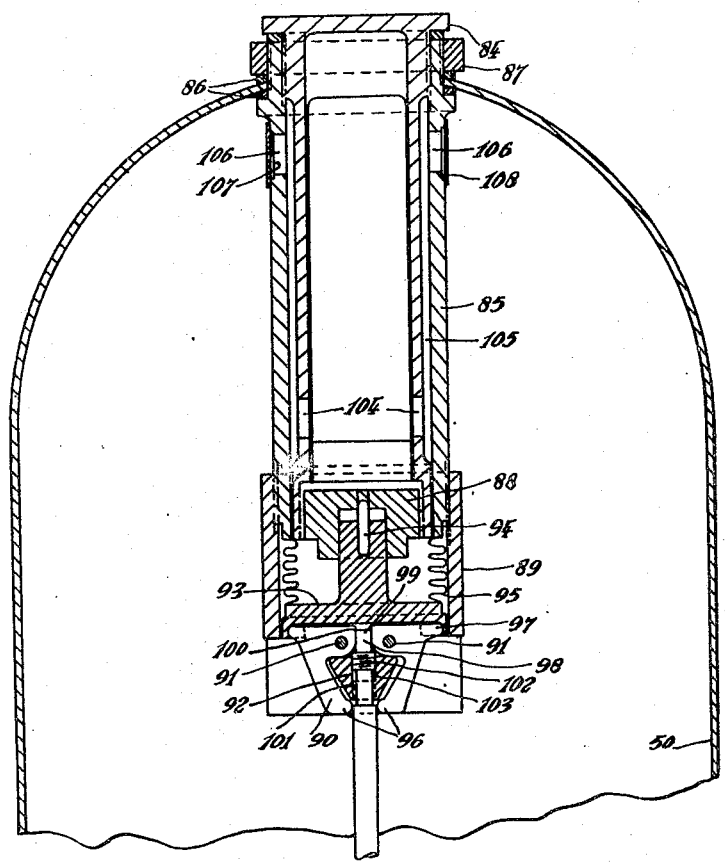
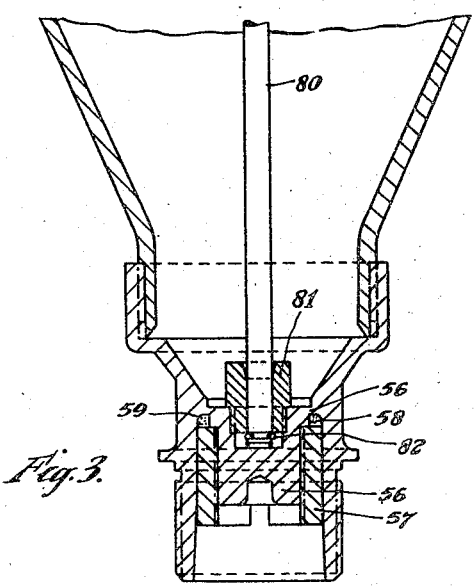
Fig. 3.
INVENTORS
A. MATHISEN,
H. B. RANDOLPH
BY
Benj. Chrony
THEIR ATTORNEY July 24, 1951   A. MATHISEN ET AL   2,562,110
MEANS FOR STOPPERING AND OPENING CONTAINERS
Filed Feb. 10, 1949   7 Sheets-Sheet 4

INVENTORS
A. MATHISEN,
H. B. RANDOLPH
By
Bjn. J. Clrry
THEIR ATTORNEYS

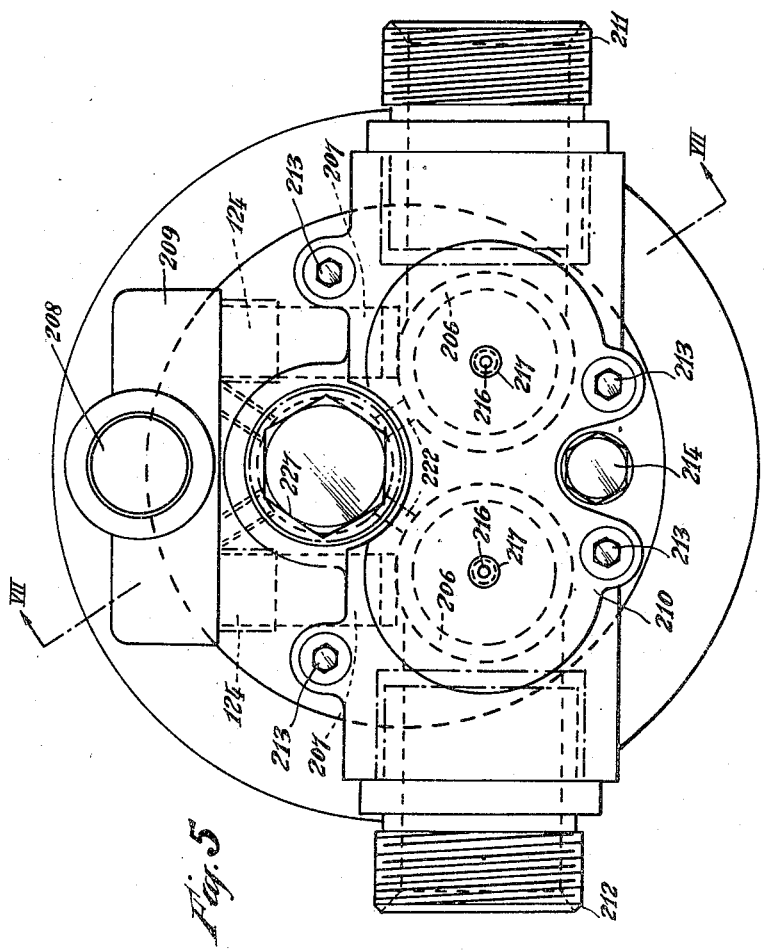

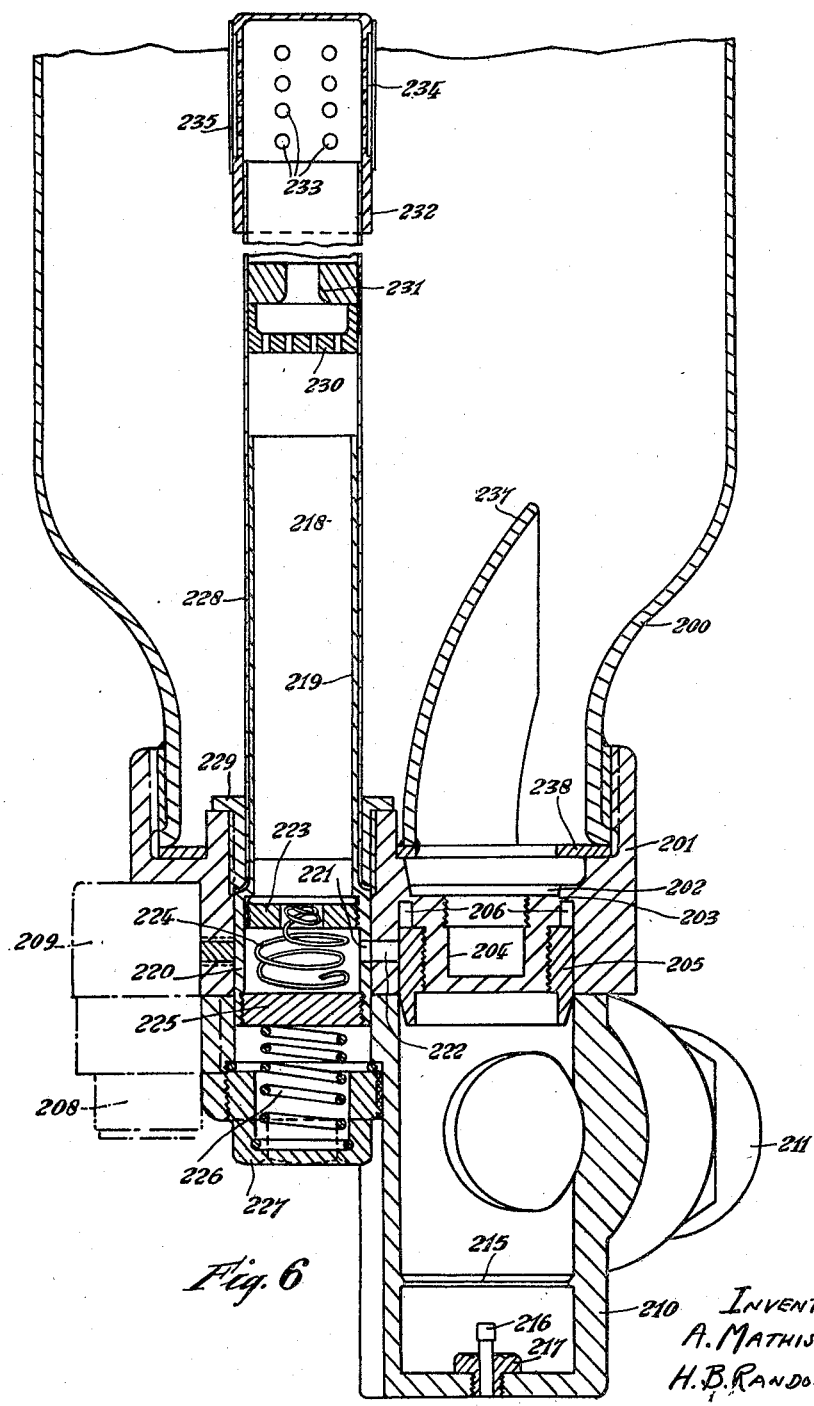

July 24, 1951  A. MATHISEN ET AL  2,562,110
MEANS FOR STOPPERING AND OPENING CONTAINERS
Filed Feb. 10, 1949  7 Sheets-Sheet 7

Inventors
A. Mathisen,
H. B. Randolph
By
Ben. J. Chany
THEIR ATTORNEY

Patented July 24, 1951

2,562,110

UNITED STATES PATENT OFFICE 2,562,110

MEANS FOR STOPPERING AND OPENING CONTAINERS

Anders Mathisen, St. James, London, and Harry Beckham Randolph, Pall Mall, London, England, assignors of one-fourth to Graviner Manufacturing Company Limited, a British company, and one-fourth to The Wilkinson Sword Company Limited, a British company, both of London, England Application February 10, 1949, Serial No. 75,712
In Great Britain March 9, 1948

25 Claims. (Cl. 169—11)

This invention relates to fluid containers of the kind in which the discharge of the fluid contents is effected under the action of pressure gases evolved from the combustion of a cartridge suitably mounted in the container (hereinafter referred to as "of the kind described").

Containers of the kind described have hitherto been operated by a hand striking knob, actuation of which strikes the percussion cap of the cartridge to ignite the cartridge.

The object of the present invention is to provide a fluid container of the kind described which can be safely and reliably arranged for remote control operation.

A fluid container made according to the present invention comprises a stoppering device including a frangible seal, means for rupturing said frangible seal to permit discharge of the container, means for generating pressure to eject the fluid when said frangible seal has been fractured and means governed by the fracture of said frangible seal for initiating the operation of said pressure generating means immediately after the fracture of the frangible seal. The means for rupturing the frangible seal may be remote controlled.

Means may be provided which operate automatically when the seal is broken to ignite the cartridge.

The seal may comprise a disc, plug or like member connected to the wall of the discharge outlet by a readily fractured web or the like integral with the wall and with the plug or the like.

The means for breaking the seal may be electrically actuated, or they may be actuated by fluid pressure.

In the case that the means for breaking the seal are electrically actuated they may be arranged to explode or detonate a substance to blow out the plug or the like. The ignition of the cartridge may be effected by an electrical circuit which is normally open but is automatically closed when the seal is broken. Or the cartridge may have a percussion cap and ignition of the cartridge may be effected by a striker pin actuated by mechanical means when the seal is broken to strike the percussion cap.

The striker pin may be carried on a crosshead mechanically connected to the seal, whereby when the seal is burst the striker pin moves to strike the percussion cap. Or the seal may be operatively associated with a cam device which acts on a member carrying the striker pin, when the seal is broken, to move the striker pin to strike the percussion cap.

Instead of having a percussion cap the cartridge may be ignited by a suitable substance disposed adjacent to the cartridge and arranged to be ignited as by a detonator flash.

The fluid container may have two or more fluid discharge outlets, each of which is closed by a seal which can be readily fractured.

The cartridge may be mounted in a holder and means may be provided for restricting the flow of pressure gases evolved by the cartridge from the holder into the container, for the purpose hereafter described.

Other features of the invention are set out in the appended claims.

In the accompanying drawings which illustrate various forms of fluid pressure appliance made according to the invention all employing a cartridge for producing the discharge pressure:

Figs. 2 and 3 illustrate respectively two arrangements in which the cartridge has a percussion cap and is ignited by a striker pin actuated mechanically;

Fig. 5 is an end view of a fluid pressure appliance having two discharge outlets, arranged to discharge in different directions, in which the cartridge is ignited by a detonator flash similar to the arrangement of Figs. 4 and 4a;

Fig. 6 is a section on line VII—VII, Fig. 5;

Figure 1:
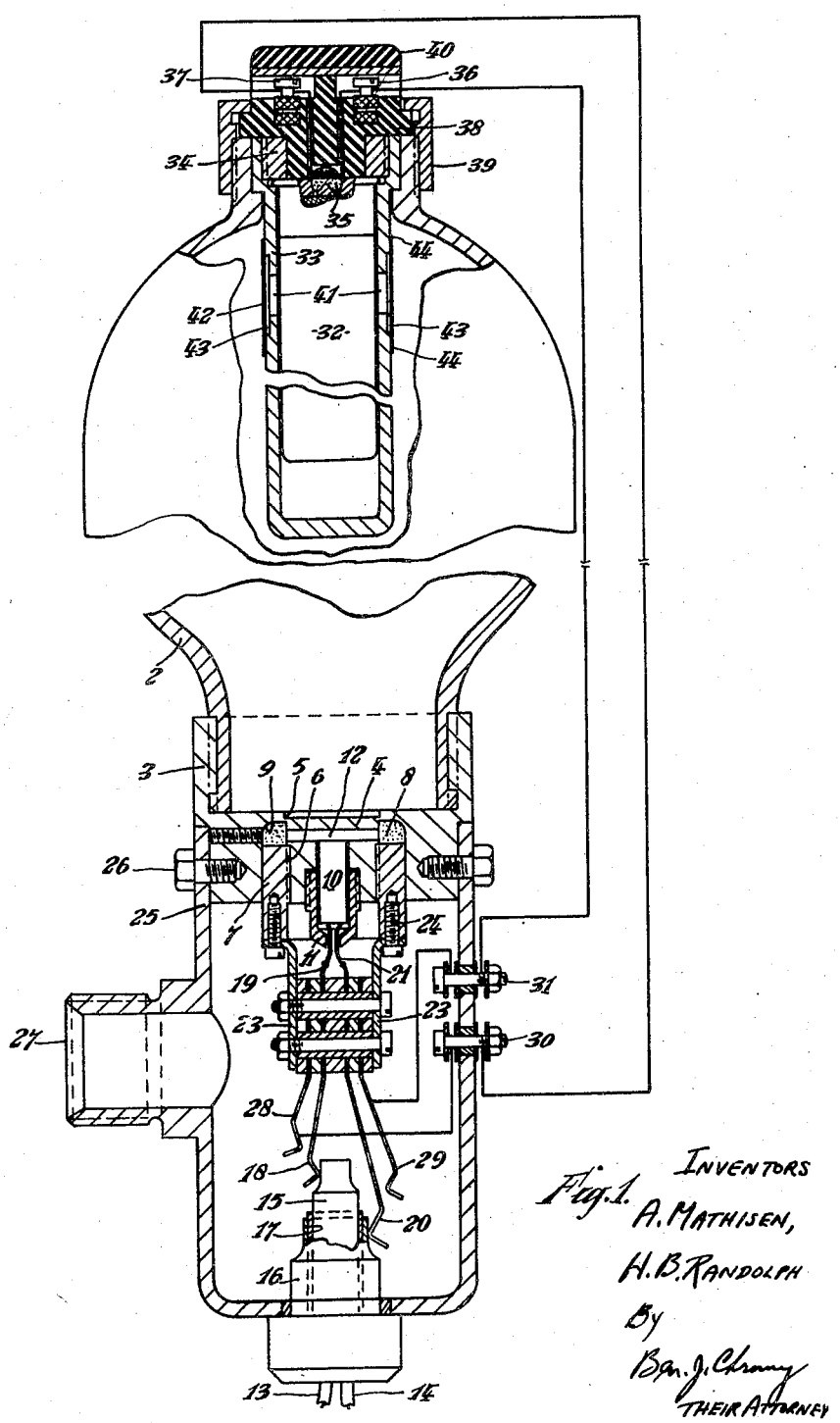
Fig. 1 illustrates an arrangement in which the cartridge is ignited electrically.

Referring first to Fig. 1 of the drawings numeral 2 denotes a solid drawn copper container or bottle which contains the fire extinguishing liquid. Numeral 3 denotes a screw threaded cap or head secured to the bottle in a liquid tight manner and incorporating an integral stopper or stud 4 machined out of cap 3 and joined thereto by a diaphragm 5 of thin section. The stud 4 is provided with a screw thread 6 which is engaged by a ring nut 7 which confines a quantity of explosive material 8 in a groove 9 formed in the head 3. The stud 4 is bored out centrally and provided with an electrically ignitable fuse 10 secured in stud 4 by a holder device 11, a transverse passage 12 forming a communication from the end of the fuse 10 to the explosive material 8, whereby ignition can be effected. Ignition of the fuse 10 is effected by closure of an electrical switch which permits electrical current to flow through leads 13 and 14 to energise a central conductor 15 and a sleeve conductor 16, which latter are spaced from one another by insulation sleeve 17. Conductor 15 engages spring contact 18 electrically connected to lead 19 of the fuse 10 and conductor sleeve 20 is electrically connected to lead 21 of fuse 10. Contacts 18 and 20 are carried by a contact assembly 22 held by brackets 23 secured by means of screws 24 to ring nut 7.

The above described arrangement is enclosed in a junction box fitting 25 secured by screws or other means 26 to head 3, the junction box being provided with an outlet orifice 27 to which distributing piping can be connected.

When current is supplied to leads 13 and 14 fuse 10 is energized to ignite the explosive substance 8 which causes stud 4 to fracture the diaphragm 5, so that the stud 4, including the ring 7 and the contact assembly 22 are blown out, thereby causing spring contacts 18 and 20 to make contact with auxiliary spring contacts 28 and 29, these contacts being connected by means of electrical leads and suitably insulated terminals 30 and 31 secured in the junction box fitting 25.

The other end of the container 2 supports the pressure generating cartridge 32 in a metal holder 33. The holder 33 is provided with a screw ring 34 which secures cartridge 32 in the holder 33. Cartridge 32 is of the kind similar to shot gun cartridges, except that the percussion cap is removed and replaced by ignition substance 35 which ignites the cordite composition pressure generating cartridge 32 when energised from terminals 30 and 31 by means of electrical leads connected to terminals 36 and 37 mounted in an insulation block 38 secured to bottle 2 by screw cap 39. The terminal blocks 36 and 37 are protected by a terminal block cover 40.

Cartridge holder 33 will commence to burn and generate gases at the end at which it is ignited and the burning action will burn through the cardboard casing. Apertures 41 are provided in the casing 33 and are covered by a thin metal foil sleeve 42 which also covers a circumferential space 43 formed in holder 33, the foil sleeve 42 being soldered or otherwise secured in a liquid-tight manner to the holder 33 at the ends 44.

When, as a result of the energisation of ignition substance 35, the cartridge commences to burn, gases are discharged through apertures 41 and the space 43, thereby exerting a considerable pressure on foil 42, causing this to fracture so that the generating gases escape into the upper end of the bottle, forcing the liquid out of the apertured discharge orifice formed by the severance of the diaphragm 5. As will be evident it is not possible in the construction shown to energise cartridge 32 before the stud 4 has been severed from the diaphragm 5 to permit spring contacts 18 and 20 and 28 and 29 to come into contact.

Referring now to Fig. 2 numeral 50 denotes a solid drawn copper container or bottle having only one open end or neck, the bottle being filled with liquid denoted 51. In this case the discharge head is in the form of a brass pressing 53, machined to form a thin diaphragm 54 by machining stud 56 out of head 53. The stud 56 is screw threaded and provided with a ring nut 57, which confines explosive substance 58 in a groove 59 which explosive substance can be ignited by an electrically ignited fuse, not shown in the drawing. Head 3 is screw threaded and has secured thereto a discharge fitting or junction box 60 which is provided with a connecting nipple 61 to provide for the connection of discharge piping thereto. In this construction, the pressure generating cartridge is denoted 62 and is secured in a holder 63 of metal or similar material supported by three or more rods 64 secured to a ring device 65 held by the bottle 50 and head 53, as shown in the drawing, and apertured at 66 to permit passage of liquid 51 from the bottle 50 into the junction box fitting 60, after blowing out stud 56. Cartridge 63 is in this construction provided with a percussion cap similar to a shot gun cartridge, and the cartridge is secured in holder 63 by means of a screw threaded cap 67. The cartridge percussion cap can be ignited by a percussion pin 68 carried by a stem 69 secured to a yoke 70 which is again secured by means of tension rods 71 which are secured in a second yoke fitting 72 having a rod 73 secured thereto, which rod is secured at the other end by means of a gland nut 74 to stud 56.

To prevent liquid passing stem 69 and pin 68 into the cartridge casing a corrugated metal bellows 75 is soldered to cap 67 and to a flange of the stem 69, said bellows 75 being capable of extension and contraction without fracture.

As will be seen when the explosive substance 59 is ignited to blow out the stud 56 and ring 57, rod 73, by means of yoke 72, rod 71 and yoke 70 displaces stem 69 and forces pin 68 into contact with the percussion cap in the cartridge 62, causing the latter to ignite. Thus in this construction also ignition of the cartridge 62 is not possible until stud 56 is blown out.

The holder 63 is provided with holes 76 through which the gases generated escape into space 77 under a thin metal foil ring 78, soldered at the edges to holder 53 to prevent liquid entering the cartridge casing.

Referring now to Fig. 3 the construction of the container head is substantially identical to that shown in Fig. 2, except that a rod 80 is secured to stud 56 by means of a screwed bush 81 and a circlip or wire ring 82, the arrangement being such that when stud 56 and ring nut 57 are blown out the rod 80 is displaced therewith.

In this construction the pressure generating cartridge 73 is mounted in a holder 84 which, again, is secured in a tubular casing 85 secured in an aperture in the spherical portion of container 50 and secured thereto by resilient rings 86 and a clamping ring nut 87. The holder 84 can be screwed into and removed from the casing 85 to enable the cartridge to be removed from the extinguisher, which is an advantage when the latter has to be stored, for example before use.

The cartridge 83 is secured in holder 85 by a screw threaded cap 88. The tubular casing 85 is provided with an end fitting 89, which carries a pair of pawls 90 mounted on pivot pins 91 and capable of actuation by a cam 92 carried by the rod 80.

Pawls 90 actuate a stem fitting 93 carrying a percussion pin 94 which ignites cartridge 83 when the stud 56 is blown out. To prevent liquid entering past the stem 93 and pin 94 into the cartridge casing 85, a corrugated metal bellows device 95 is secured to casing 85 and stem fitting 93 as shown in the drawing. The displacement of percussion pin 94 and stem 93 is obtained by the action of cam 92 on the noses 96 of the pawls 90 and by the action of the noses 97 of pawls 90 on the stem fitting 93.

To prevent accidental displacement of stem fitting 93, arising for example by pressure variation in the container 50 due to temperature variation, noses 97 are enclosed in a central recess 98 in stem fitting 93. To prevent undesired movement of pawls 90 under normal conditions, rod 80 is provided with a reduced portion 99 which engages heel portion 100 of pawls 90, and to permit lost movement between rod 80 and cam 92, cam 92 is screwed at 101, through which a screwed portion 102 on rod 80 can be screwed into an undercut portion 103 in cam 92, providing for free movement of the screwed portion 102 in cam 92.

When stud 56 and ring 57 are blown out, rod 80 is pulled down by screwed bush 81, causing the screwed portion 102 of the rod to move into contact with the screw thread 101 and similarly causing withdrawal of reduced portion 99 of rod 80 from the pawl heels 100, whereby cam 92 causes pawls 90 to pivot on pins 91 owing to contact with the noses 96, this again causing noses 97 to displace stem fitting 93 and to force the percussion pin 94 into contact with the percussion cap in cartridge 83.

The generated gases escape through apertures 104 in the holder 84, and pass through a recessed space in this holder 105 to apertures 106 in the tubular casing 85, and into space 107, fracturing the metal foil sleeve 108 and escaping into the upper portion of container 50.

Figure 4A:
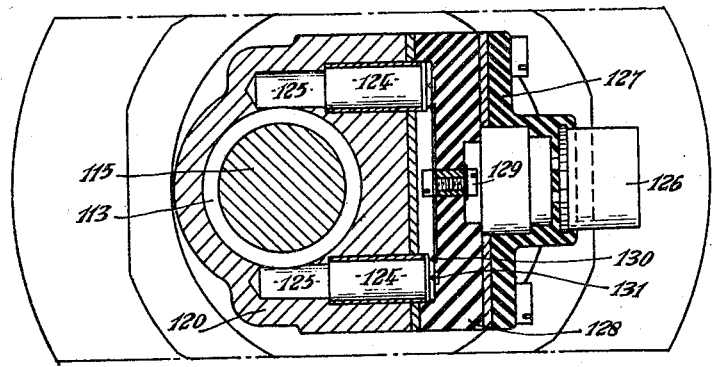
Fig. 4a is a section on line A—A, Fig. 4, illustrating the detonator arrangement.
Figure 4:
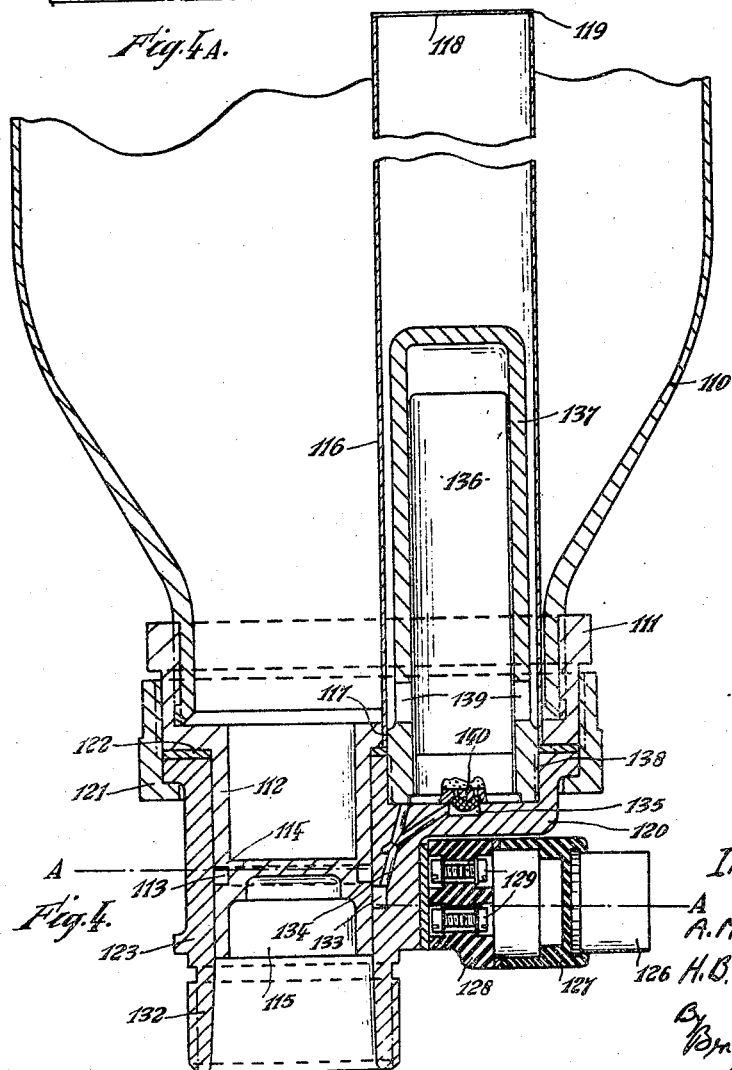
Fig. 4 illustrates an arrangement in which the cartridge is ignited by a detonator flash.

Referring now to Figs. 4 and 4A numeral 110 denotes a solid drawn copper container having only one opening or neck which is large in comparison with the openings of the bottles described in Figs. 1, 2 and 3. The bottle is now provided with the cap fitting 111 secured to the bottle in a liquid-tight manner, which fitting is provided with a rod-like projection 112 bored out internally and provided with an external groove 113 to form a thin section diaphragm 114 and a removable plug portion 115. The cap fitting 111 is further provided with a tubular member or stand pipe device 116 soldered or otherwise secured in a liquid-tight manner to fitting 111 at 117. Stem pipe 116 projects into close proximity to the spherical end of bottle 110, the end, however, being sealed in a liquid-tight manner by a disc 118, soldered at 119 to the end of stand pipe 116, to form a liquid-tight joint.

The bottle when fitted with parts 111 and 116 will be hermetically closed except for a charging plug device, not shown in the drawing, but which permits of introducing a fire extinguishing fluid.

In order to effect discharge of the contents of container 110 a false or detachable discharge head is provided comprising a fitting 120 secured to cap fitting 111 by a gland nut 121, a sealing washer or gasket 122 being provided between cap fitting 111 and fitting 120 to form a gas and liquid-tight joint when nut 121 is screwed tightly on to cap 111.

Fitting 120 is provided with a tubular extension 123 fitting closely under projection 112. As shown in Fig. 4A, fitting 120 is provided with a pair of electrically ignited detonators 124, 124 which are disposed in drilled passages 125, 125, communicating with groove 113. Electrical connection is made to detonators 124 by means of a known type of plug-in socket device 126 moulded into a cover 127 of terminal block device 128. The plug-in pins of the socket 126 not shown in the drawing are electrically connected to terminal screws 129, these latter being connected by means of metal strips to contact points 130 and 131. The arrangement is such that when an electric current is connected to contacts 130 and 131 ignition of detonators 124, 124 is effected in known manner thereby effecting detonation with the evolution of a large volume of gases, with explosive violence, thereby causing rupture of diaphragm 114 and blowing out the plug 115, to permit discharge of the contents of container 120 through suitable distributing piping connected to the suitably screw threaded discharge socket portion 132 of fitting 123.

As shown in Fig. 4, a recess 133 is formed in fitting 123 which communicates through a bore 134 with a cavity 135, also formed in fitting 123.

The purpose of this arrangement is to effect ignition of a pressure generating cartridge 136, which is mounted in a holder 137 screwed into cap fitting 120 by means of a screw thread 138 and is provided with apertures 139 which permit escape of gases into the stand pipe 116.

When the pressure has risen sufficiently the gases will fracture the disc 118 or blow it off its soldered joint 119 and escape into the container 110.

In this construction the pressure generating cartridge is not provided with a percussion cap, but with a quantity of easily ignitable priming substance 140 which, when impinged upon by a flame of explosive gases from space 113 and through the bore 134 causes ignition of cartridge 136.

As will be seen groove 113 does not coincide with recess 133, and, therefore, ignition of cartridge 136 is not possible before the diaphragm 114 has been severed and the plug portion 115 displaced a short distance, but in this connection it will be understood that the explosive gases evolved by detonators 124 are comparatively large and the pressure is very high, so that the liquid in the bored out recess in projection 112 will tend to be blown backwards into the container while plug portion 115 is blown out into a junction box device screwed on to socket portion 132. As soon as plug portion 115 uncovers recess 133 a flash of explosive gas will be projected on to priming substance 140 causing ignition of cartridge 136 and subsequent generation of gases to expel the liquid in container 110.

As will be appreciated fitting 123 is removable from the container 110 by unscrewing gland nut 121 from cap 111, and the fitting, including the cartridge 136 in its cartridge holder 137, can then be withdrawn from the container and stored separately; this may be an advantage in the case of fire fighting fluid containers provided with explosive devices when these are to be used upon military and other types of aircraft.

For storage purposes a cover or cap device may be provided which fits on to cap portion 111 to protect parts 112, 114 and 115 against damage and also to cover the outlet from stand pipe 116.

Pressure generating cartridges 136 are more normally available with percussion caps instead of priming substance 146, and if it should be necessary to use cartridges having percussion caps a similar arrangement to that described in connection with Fig. 3 may be fitted the holder 137 then being suitably modified to provide space for the percussion pin and its piston like holder. In this case the gases from the bore 134 would act on the piston to force the percussion pin into contact with the percussion cap of the cartridge to effect ignition of the cartridge. The construction of this modification being fairly obvious it is not separately illustrated.

Referring now to Figs. 5 and 6, these figures show an enlarged neck solid drawn copper bottle 200 of the usual bottle shape this being provided with a cap fitting 201 in which a pair of discharge outlets are provided. More than two discharge outlets may be provided. As shown in Fig. 6 each discharge outlet consists of a bored out recess 202 separated by a thin section diaphragm 203 from a plug portion 204 integral with cap 201 and provided with a ring nut 205, an annular space 206 being formed between the plug portion 204 and the ring nut 205. As shown in Fig. 5 the annular space 206 communicates with a recess 207.

Two detonators 124 are provided and arranged to be energised similarly to the detonators 124, 124 of Fig. 4a, an electrical plug-in socket 208 connected to a terminal block device 209 being provided for the purpose of effecting ignition of the detonators 124.

Cap fitting 201 has secured thereto a dual junction box fitting device 210 having discharge outlets 211 and 212, the device 210 being secured to the cap fitting 201 by screwed studs 213, 213, which permit removal of the device 210 from the cap fitting 201. A charging plug 214 for filling liquid into the container 200 is provided in cap fitting 201, as shown in Fig. 5.

Device 210 is provided with an inwardly projecting rim 215 which serves to trap ring nut 205 and stud 204 when these are blown off by the explosive force of a detonator 124 into the junction box device 210 and an indicator pin 216 having a press fit in a screwed stud 217 is secured in fitting 210, this pin being displaced by stud 204 to indicate that discharge has taken place.

The pressure generating cartridge 218 is mounted in a holder 219 having an elongated sleeve 220 provided with an orifice 221 communicating with an orifice 222 through which the explosion flashes will pass when ring nut 205 uncovers the orifice 222, similarly to the arrangement described in connection with Fig. 4.

The pressure generating cartridge 218 is secured in holder 219 by a screwed ring 223 and is provided with an ignition wick 224 which is ignited by the flash through apertures 221 and 222. A screwed disc 225 confines the ignition wick 224 in a space in the elongated sleeve 220 and a spring 226 held by a screw cap 227 abuts against the end of screwed disc 225 to ensure that cartridge 218 and its holder 219 is not displaced with respect to orifice 222 under normal storage and installation conditions. For this purpose holder 219 is guided in the recess in which it is mounted in cap 201 by means not shown in the drawing to prevent rotation. Cartridge holder 219 is enclosed in a stand pipe 228 secured by means of a gland nut 229 in cap fitting 201 as indicated in Fig. 6. The stand pipe is fitted with a grid or particle trap fitting 230 and a pressure regulating Venturi construction 231 and a perforated cap fitting 232 is secured on the end of pipe 228, said perforated cap being provided with a number of perforations 233 and an annular recess 234 which is covered by thin metal foil strip 235 soldered to the cap fitting 232.

When containers constructed according to the invention are used upon aircraft it is sometimes a convenience to be able to mount them in a lying down or horizontal position, and in such cases a guide shield 237 formed upon an apertured guide ring 238 may be provided, the guide ring being secured between the top of the bottle 200 and cap fitting 201 as shown in Fig. 6. As will be appreciated when the stopper and discharge block 204 is removed and the cartridge 218 commences to generate pressure the liquid will be discharged through one of the outlets passing underneath shield 237, this fitting only being used in cases in which the container is required to be mounted in a lying down or substantially horizontal position.

The container shown in Figs. 5 and 6 provided as described with two (or more) discharge outlets is electrically wired so that either one of the outlets can be used to effect discharge or if required both can be used at the same time, for example to discharge fire extinguishing liquid to either one of two power plants in an aircraft or to both at the same time.

Upon ignition of a detonator 124 diaphragm 203 will be severed as a result of the generation of gas pressure in space 206, and, a stud 204 and ring nut 205 are blown into the junction box fitting 210, an explosive flash passes through holes 222 and 221 and ignites ignition substance 224 which instantaneously ignites the pressure generating cartridge 218, this being of the kind to generate gas pressure at its upper end in the position shown in Fig. 6. Holder 219 is free to move in stand pipe 228 and as a result of the pressure variation and of the restriction of parts 230 and 231 the holder 219 and its sleeve 220 moves backwards against the pressure of spring 226 to close the outlet to aperture 222 which prevents loss of fire extinguishing fluid through aperture 222.

As shown in Fig. 5 apertures 221 and 222 are provided upon both discharge orifices but owing to the position of the ring nut 205 against aperture 222 flash back from one detonator to another is not possible.

As regards the devices 230 and 231 it may be explained that pressure generating cartridges 218 are generally designed to generate pressure gases under definitely specified pressure conditions and if, for example, the cartridge discharges gases through an open ended pipe, as shown for example in Fig. 4, it has been found that occasionally the discharge of liquid commences under high pressure but tapers off as liquid is discharged from the extinguisher and the gas space increases. This is considered to be due to the lowering of the back pressure against the pressure generating cartridge.

Furthermore, when cartridges are ignited and required to generate pressure at a high rate, burning particles tend to be torn away from the pressure generating substances. For this reason, the trap 230 is interposed to trap such particles or to ensure that they are burnt before they pass through the restricting orifice 231. This device regulates and restricts the pressure discharge rate from the cartridge in order to be independent of the back pressure in the container. By this means it is possible, for example, to use cartridges designed to generate pressure gases at maximum efficiency and rate of burning at a back pressure of about 500 to 600 lbs. per square inch, the restriction 230 being designed to ensure that this back pressure is maintained irrespective of the pressure in the extinguisher. Experience has shown that by this means the maximum rate of discharge of the contents of the container is obtained without risk of the pressure generating cartridge ceasing to burn at the most effective rate owing to loss of back pressure.

Figure 7A:
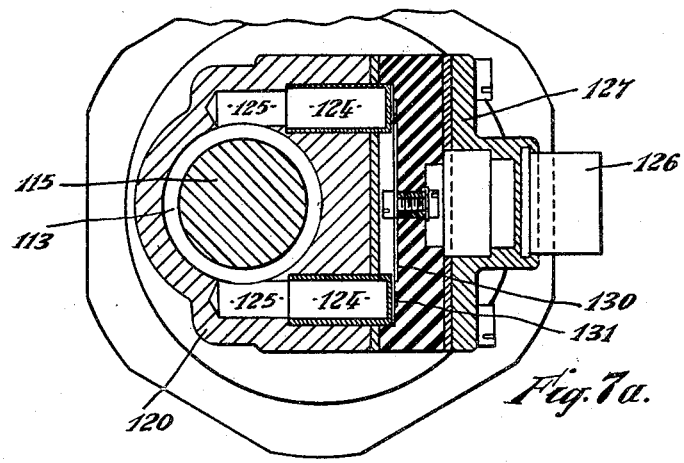
Fig. 7a is a section on line VIII—VIII, Fig. 7.
Figure 7:
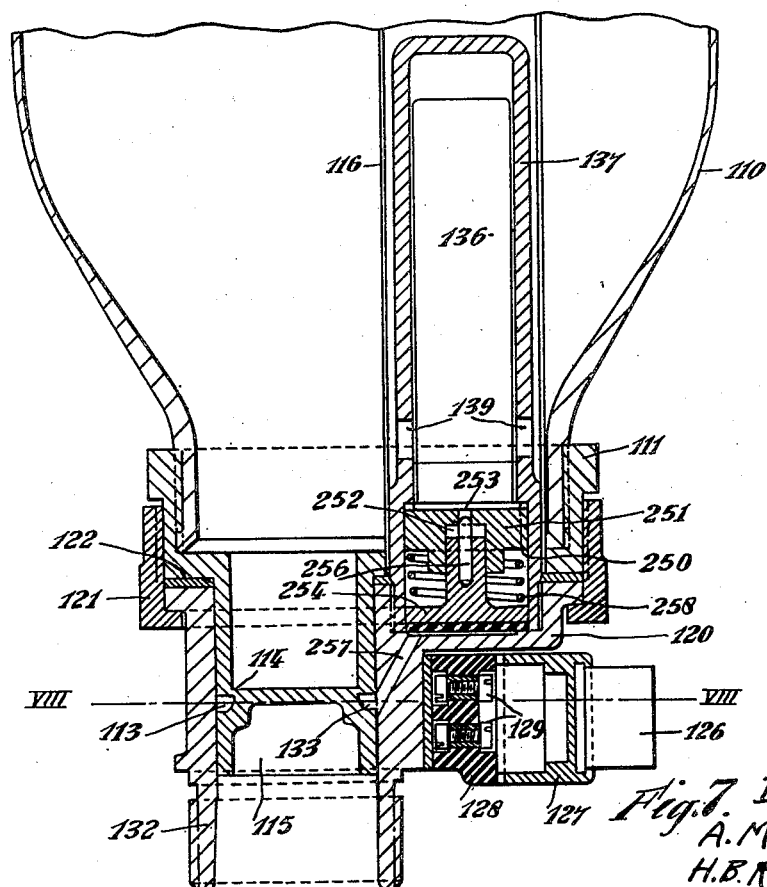
Fig. 7 illustrates an arrangement somewhat similar to Fig. 4, but in which the pressure produced on detonation actuates a striker pin.

In Figs. 7 and 7a parts similar to corresponding parts of Figs. 4, 4a are denoted by like reference numerals and need not be further described. In the arrangement shown in Figs. 7 and 7a the cartridge 136 has a percussion cap and the end of the holder 137 in the cap fitting 120 is formed as a cylinder 250 of somewhat larger bore than the rest of the holder. A block 251 fixed in one end of the cylinder 250 is formed with a central bore of two diameters, namely a larger diameter bore 252 and a smaller diameter bore 253. A piston 254 is slidably mounted in the cylinder 250 and has a stem 255 engaging in the bore 252, this stem having a central bore in which is contained a striker pin 256. In this construction the recess 133 communicates by way of a bore 257 with the interior of the cylinder 250. A spring 258 bears against the oppositely disposed surfaces of the block 251 and of the piston 254.

In the arrangement shown in Figs. 7 and 7a on detonation of the detonators 124 to rupture the diaphragm 114, as described in connection with Figs. 4 and 4a, pressure gases pass through the bore 257 and enter the cylinder 250, pressing back the piston 254 and causing the striker pin 256 to ignite the cartridge 136.

What we claim and desire to secure by Letters Patent is:

1. A fluid container comprising a stoppering device including a frangible seal, means for rupturing said frangible seal to permit discharge of the container, means for generating pressure to eject the fluid when said frangible seal has been fractured, and means governed by the fracture of said frangible seal for initiating the operation of said pressure generating means immediately after the fracture of the frangible seal.

2. A fluid container comprising a stoppering device including a frangible seal, remote control means for rupturing said frangible seal to permit discharge of the container, means for generating pressure to eject the fluid when said frangible seal has been fractured, and means governed by the fracture of said frangible seal for initiating the operation of said pressure generating means immediately after the fracture of the frangible seal.

3. In a fluid container having a discharge outlet for the fluid contents, a frangible seal closing said discharge outlet, means for breaking said seal to provide an outlet for the fluid and pressure means for discharging said fluid, said pressure means comprising an ignitable cartridge mounted in the container and adapted on combustion to evolve pressure gases, and means governed by the fracture of said frangible seal for initiating the ignition of said cartridge to discharge the fluid contents of said container.

4. In a fluid container having a discharge outlet for the fluid contents, a frangible seal closing said discharge outlet, explosive means for breaking said seal to provide an outlet for the fluid, an ignitable cartridge mounted in the container and adapted on combustion to produce pressure gases to discharge the fluid in the container under pressure and means for igniting said cartridge, said last mentioned means including a duct arranged to be uncovered when said seal is broken said duct being arranged within the range of said explosive means, whereby a flash from the explosion passes through said duct to ignite said cartridge.

5. In a fluid container having a discharge outlet for the fluid contents, a seal closing said discharge outlet, said seal comprising a member connected to the wall of the discharge outlet by a readily fractured web integral with said wall and with said seal, electrical means for breaking said seal to provide an outlet for the fluid, an ignitable cartridge mounted in the container and adapted on combustion to produce pressure gases to discharge the fluid in the container under pressure, and means governed by the fracture of said frangible seal for initiating the ignition of said cartridge.

6. In a fluid container having a discharge outlet for the fluid contents, a seal closing said discharge outlet, said seal comprising a member connected to the wall of the discharge outlet by a readily fractured web integral with said wall and with said seal, electrical means for breaking said seal to provide an outlet for the fluid, said means comprising a substance adjacent the seal adapted to be exploded or detonated by said electrical means to break said seal, an ignitable cartridge mounted in the container and adapted on combustion to produce pressure gases to discharge the fluid in the container under pressure, and means for igniting said cartridge, said last mentioned means operating automatically after the seal is broken.

7. A fluid container according to claim 6 comprising electrical means for igniting said cartridge, said electrical means comprising an electric circuit which is normally open and means operated by the breaking of the seal to close said circuit to ignite said cartridge.

8. A fluid container according to claim 6 in which said cartridge is fitted with a percussion cap and further comprising a striker pin and mechanical means operated when said seal is broken to operate said striker pin to ignite said cartridge.

9. A fluid container according to claim 6 in which said cartridge is fitted with a percussion cap and further comprising a cross-head mechanically connected to said seal, and a striker pin carried on said cross-head, whereby when said seal is broken said striker pin moves to strike said percussion cap.

10. A fluid container according to claim 6 in which said cartridge is fitted with a percussion cap and further comprising a striker pin, a member carrying said striker pin, and a cam device which operates when said seal is broken to move said striker pin to strike the percussion cap.

11. A fluid container according to claim 5 further comprising a detonator adapted to be actuated by said electrical means to break said seal, and an ignitable substance adapted to be ignited by a flash from said detonator when the seal is broken and to ignite said cartridge.

12. A fluid container according to claim 5 further comprising a detonator adapted to be actuated by said electrical means to break said seal, an ignitable substance disposed adjacent to said cartridge, and communicating means between said ignitable substance and said discharge outlet, said communicating means being normally sealed by said seal, but uncovered when said seal is broken, whereby when said seal is broken a flash from said detonator can pass along said communicating means to ignite said ignitable substance, thereby producing ignition of said cartridge.

13. In a fluid container having a plurality of discharge outlets for the fluid contents, a seal in each of said discharge outlets to close respectively said discharge outlets, each of said seals comprising a member connected to the wall of the discharge outlet with which it is associated by a readily fractured web integral with said wall and with said seal, separate detonator means arranged respectively to fracture one of said seals to provide an outlet for the fluid, electrical means for actuating said detonators, an ignitable cartridge mounted in the container, an ignitable substance disposed adjacent to said ignitable cartridge and adapted to be ignited by a flash from one of said detonators after the corresponding seal has been broken to ignite said cartridge, said cartridge being adapted on combustion to produce pressure gases to discharge the fluid in the container under pressure.

14. A fluid container according to claim 13 having a space containing said ignitable substance, said space being disposed adjacent to said seal, and further comprising a member associated with said seal, said member blocking communication between said space and the discharge outlet closed by said seal, said member being fixed to move with said seal, whereby when said seal is fractured a flash from said detonator means can pass to and ignite said ignitable substance.

15. A fluid container according to claim 13 further comprising a tubular holder in which said cartridge is mounted, and a stand pipe having a sealed end in which said tubular holder is mounted, the arrangement being such that when said cartridge is ignited the pressure gases evolved can readily fracture said sealed end and escape into the container.

16. A fluid container according to claim 4 further comprising a tubular holder in which said cartridge is mounted, a stand pipe in which said tubular holder is mounted, and means associated with said stand pipe for restricting the flow of pressure gases therefrom into the container when said cartridge is ignited.

17. A fluid container according to claim 4 further comprising a tubular holder in which said cartridge is mounted, a stand pipe in which said tubular holder is mounted, and means associated with said stand pipe for restricting the flow of pressure gases therefrom into the container when said cartridge is ignited, said restricting means comprising at least one perforated member associated with the stand pipe through which the pressure gases must pass.

18. A fluid container according to claim 13 further comprising a tubular holder in which said cartridge is mounted, and a stand pipe having a sealed end in which said tubular holder is mounted, the arrangement being such that when said cartridge is ignited the pressure gases evolved can readily fracture said sealed end and escape into the container, and means for restricting the outflow of pressure gases from said stand pipe into the container.

19. A fluid container according to claim 13 further comprising a tubular holder in which said cartridge is mounted, and a stand pipe having a sealed end in which said tubular holder is mounted, the arrangement being such that when said cartridge is ignited the pressure gases evolved can readily fracture said sealed end and escape into the container, and means comprising at least one perforated member associated with the stand pipe for restricting the outflow of pressure gases from said stand pipe into the container.

20. A fluid container according to claim 13 further comprising a tubular holder in which said cartridge is mounted, and a stand pipe having a sealed end in which said tubular holder is mounted, the arrangement being such that when said cartridge is ignited the pressure gases evolved can readily fracture said sealed end and escape into the container, said sealed end comprising a closure cap fitted over the end of the stand pipe and having a perforated wall over which the seal is fixed.

21. A fluid container according to claim 4 further comprising a tubular holder in which said cartridge is mounted, a stand pipe in which said tubular holder is mounted, and means associated with said stand pipe for restricting the flow of pressure gases therefrom into the container when said cartridge is ignited, said restricting means comprising two perforated members and a Venturi tube disposed in the stand pipe between said perforated members.

22. A fluid container according to claim 13 having a space containing said ignitable substance, said space being disposed adjacent to said seal, a cartridge holder in which said cartridge is mounted, two discs screwed into the bottom of said cartridge holder to define said space, one of said discs having an aperture to provide communication with said cartridge and further comprising a member associated with said seal, said member blocking communication between said space and the discharge outlet closed by said seal, said member being fixed to move with said seal, whereby when said seal is fractured a flash from said detonator means can pass to and ignite said ignitable substance.

23. A fluid container according to claim 13 having an open end and comprising a holder in which said cartridge and said ignitable substance are disposed, an integral fitting bored to form two discharge outlets and to receive the end of said cartridge holder, said seals having the form of plugs formed integral with the walls of said discharge outlets.

24. A fluid container according to claim 13 having an open end and comprising a holder in which said cartridge and said ignitable substance are disposed, an integral fitting bored to form two discharge outlets and to receive the end of said cartridge holder, said seals having the form of plugs formed integral with the walls of said discharge outlets, and a guide shield secured between the neck of the container and said integral fitting to guide the fluid to be discharged through said outlet.

25. A fluid container according to claim 13 having an open end and comprising a holder in which said cartridge and said ignitable substance are disposed, an integral fitting bored to form two discharge outlets and to receive the end of said cartridge holder, said seals having the form of plugs formed integral with the walls of said discharge outlets, a junction box having two differently directed outlets communicating respectively with said discharge outlets, and an indicator pin in said junction box displaced to indicate when discharge has taken place.

ANDERS MATHISEN.
HARRY BECKHAM RANDOLPH.

REFERENCES CITED

The following references are of record in the file of this patent:

UNITED STATES PATENTS

| Number | Name | Date |
|---|---|---|
| 1,510,843 | Hawkins | Oct. 7, 1924 |
| 2,405,125 | Barnard | Aug. 6, 1946 |
| 2,417,082 | Mapes | Mar. 11, 1947 |
| 2,425,778 | Allen | Aug. 17, 1947 |